United States Patent [19]

Itou et al.

[11] Patent Number: 4,967,307
[45] Date of Patent: Oct. 30, 1990

[54] GAS INSULATED SWITCHGEAR APPARATUS

[75] Inventors: Syunji Itou; Yoshiro Suzuki; Minoru Sakaguchi, all of Hitachi, Japan

[73] Assignee: Hitachi, Ltd., Tokyo, Japan

[21] Appl. No.: 293,452

[22] Filed: Jan. 4, 1989

[30] Foreign Application Priority Data

Jan. 11, 1988 [JP] Japan .................................... 63-2592

[51] Int. Cl.$^5$ ............................................. H02B 1/04
[52] U.S. Cl. .................................... 361/335; 361/341; 361/355; 361/361
[58] Field of Search ...................... 200/50 AA, 148 B; 361/333–335, 341, 355, 361

[56] References Cited

U.S. PATENT DOCUMENTS

| | | | |
|---|---|---|---|
| 3,823,346 | 7/1974 | Olsen | 361/341 |
| 4,687,890 | 8/1987 | Yamamoto et al. | 300/148 B |
| 4,744,002 | 5/1988 | Nakano et al. | 361/341 |
| 4,752,860 | 6/1988 | Romanet et al. | 361/341 |
| 4,821,141 | 4/1989 | Torimi et al. | 361/333 |

FOREIGN PATENT DOCUMENTS

| | | |
|---|---|---|
| 54-86738 | 7/1979 | Japan . |
| 60-183908 | 9/1985 | Japan . |
| 60-183910 | 9/1985 | Japan . |
| 60-213208 | 10/1985 | Japan . |
| 62-98410 | 6/1987 | Japan . |

*Primary Examiner*—Gregory D. Thompson
*Attorney, Agent, or Firm*—Antonelli, Terry, Stout and Kraus

[57] ABSTRACT

In a gas-insulated switchgear apparatus, breakers of three phases are contained in a barrel-type sealed enclosure having an insulating gas sealed therein. At least one terminal of each of the breakers is connected to each of a plurality of main buses arranged on the outside of the sealed enclosure, and a common casing is attached to one side of the sealed enclosure to extend in the height direction thereof. The ground housing of each of the main buses is connected through an insulating spacer to the common casing. Connecting conductors for connecting the terminals of the breakers with the bus conductors of the main buses are led into the casing or a plurality of current transformers are arranged in the casing. By so doing, the sealed enclosure is reduced to a size having a sectional area sufficient for juxtaposition of the breakers of three phases and thus the whole gas-insulated switchgear apparatus is made more compact and smaller. Also, the connecting conductors and the current transformers are isolated from the breakers by arranging them inside the common casing and this has the effect of enhancing the insulation reliability and ensuring suitable arrangement of the current transformers.

27 Claims, 8 Drawing Sheets

GAS INSULATED SWITCHGEAR APPARATUS

BACKGROUND OF THE INVENTION

1. Field of the Invention

The present invention relates to gas-insulated switchgear apparatus (hereinafter simply referred to as a GIS), and more particularly to a GIS of a construction in which a plurality of main buses are connected to a gas circuit breaker of the unsegregated three-phase type.

2. Description of the Prior Art

In a known type of GIS, a circuit breaker of the unsegregated three-phase type is used which is constructed so that the breakers of three phases are arranged in a sealed cylindrical enclosure along its axial direction so as to be positioned at the apexes of an equilateral or isosceles triangle. Then, the breaker of each phase is used in such a manner that one end is connected to one or more main buses the other end is connected to an outlet terminal such as a cable head or a main bus having bus conductors disposed in a ground housing in which an insulating gas is sealed.

Usually, the main buses and outlet terminals of this type of GIS are connected through a vertical-type sealed enclosure which is provided with openings formed in sides thereof having connecting flanges to which are attached insulating spacers having current carrying conductors embedded therein. An insulating gas such as SF$_6$ is sealed in the enclosure and the enclosure is hermetically sealed. Where a plurality of main buses are connected to one side of such a sealed enclosure, each of the main buses is connected by a separate connecting flange disposed in the longitudinal direction of the enclosure and common conductors are arranged along breakers within the sealed enclosure to connect each of the main buses with one end of each of the breakers through the common conductors (see JP-A-No. 60-183910).

In the case of a type of GIS which monitors the conditions on the cable head side, the monitoring is effected by fitting a current transformer on the vertical connecting conductor from each breaker within a sealed enclosure (see JP-A- No. 60-183908). Also, in the case of another type of GIS which monitors the conditions on both the cable head side and the main bus side, the monitoring is effected by fitting a current transformer on the connecting conductor connected to each end of each breaker thereby arranging the current transformers in the upper and lower parts of a sealed enclosure or alternatively the monitoring is effected by arranging the current transformers on the sealed enclosure side of the connecting flanges (see JP-A-No. 60-213208 and JP-U-No. 62-98410). These constructions are the same with a bus connecting GIS for interconnecting main buses.

Thus, due to the arrangement of breakers of respective phases, common conductors, e.g., connecting conductors for connecting the breakers to main buses, current transformers, etc., within a sealed enclosure as mentioned above, the above-described conventional types of GIS are disadvantageous in that the insulating distance between these components, particularly the connecting conductors on the main bus side, must be ensured thus requiring an increase in the diameter of the sealed enclosure to increase the accommodating space and, thereby increasing the size of the GIS on the whole. Also, in the case of the construction in which the transformers of each phase are fitted on the connecting conductors from the ends of each breaker thereby arranging the current transformers above and below the breakers, not only the height dimension of the sealed enclosure is increased but also a measure must be taken to prevent the effects of high temperature gas due to the extinguishing of an arc during the operation of the breakers. Further, in the case of the construction where the current transformers are arranged with the connecting flange portions provided in the sealed enclosure, the size of the apparatus of the multiple main bus construction on the whole must be increased in consideration of the required accommodating space.

SUMMARY OF THE INVENTION

It is an object of the present invention to provide an improved GIS which is made smaller and more compact in overall construction.

It is another object of the invention to provide an improved GIS so designed that the places of arrangement of conductors for connecting external main buses and breakers within a sealed enclosure are suitably selected thereby improving the reliability in insulation performance.

It is still another object of the invention to provide an improved GIS which ensures a suitable arrangement of current transformers fitted on conductors on the side of a plurality of main buses.

To accomplish the above objects, in accordance with the present invention there is provided a GIS of a construction in which a plurality of main buses are arranged in order in the height direction on one side of a cylindrical sealed enclosure containing breakers of three phases and at least one terminal of each of the breakers is connected to the respective main buses by conductors, whereby a ground housing of each of the main buses is attached through an insulating spacer to a common casing attached to the side of the sealed enclosure on the main bus side so as to extend in the height direction thereof and connecting conductors between the terminals of the breakers and the bus conductors of the main buses are introduced into the common casing or alternatively current transformers are arranged within the common casing.

From the foregoing it will be seen that since the common casing is disposed on one side of the sealed enclosure and the connecting conductors from the terminals of the breakers are introduced into the common casing for connection with the bus conductors of the main buses, the sealed enclosure is reduced to a size of a sectional area sufficient for juxtaposing the breakers of the three phases thereby making the GIS more compact and smaller the GIS on the whole. Also, since the connecting conductors and the current transformers are arranged in the common casing so as to be isolated from the breakers, it is possible to improve the reliability in insulation performance and suitably arrange the current transformers.

DESCRIPTION OF THE PREFERRED EMBODIMENTS

Preferred embodiments of a GIS according to the present invention will now be described in due order with reference to FIGS. 1 to 8.

Figure 1:
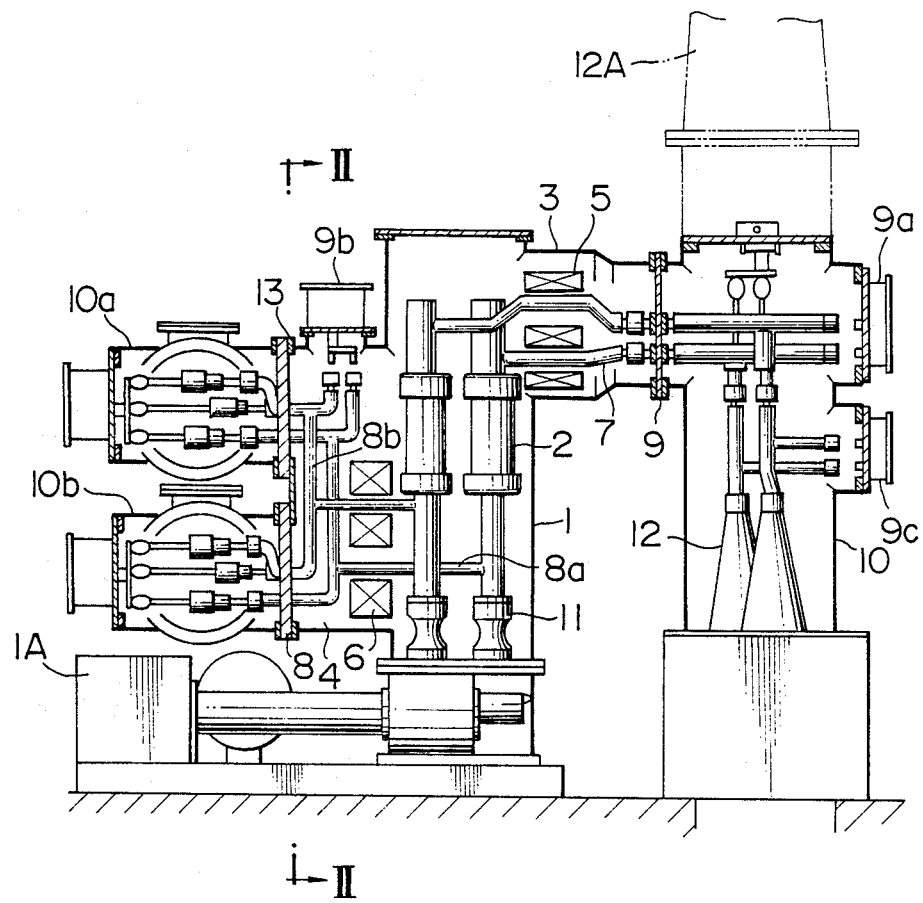
FIG. 1 is a schematic sectional view showing a gas-insulated switchgear apparatus according to an embodiment of the invention.
Figure 2:
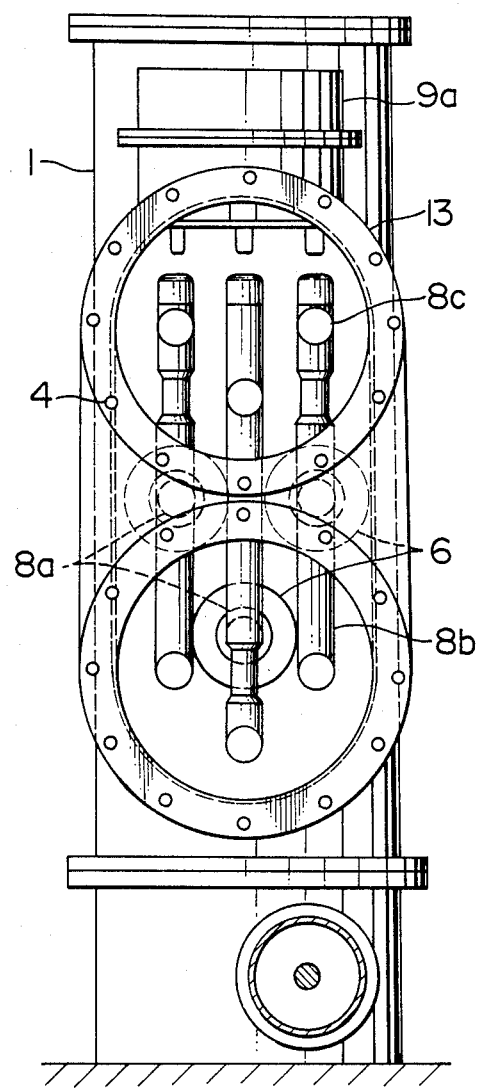
FIG. 2 is a schematic diagram looked from the line II—II of FIG. 1.

In the first embodiment of the GIS according to the invention shown in FIGS. 1 and 2, a barrel-type sealed enclosure 1 having an insulating gas sealed therein is used and usually the sealed enclosure 1 is formed into a cylindrical shape for use as a vertical type on the installation surface. The sealed enclosure 1 contains breakers 2 of three phases which are arranged to extend parallelly in the longitudinal direction (or axial direction) of the enclosure and, as is well known, the lower terminal side of each of the breakers 2 is supported by an insulating support 11 in the lower part of the sealed enclosure 1 so as to be opened and closed by an operating unit 1A which is arranged laterally to the sealed enclosure 1. Attached to one side (the main bus side) of the sealed enclosure 1 is a common casing 4 which will be described later and a branch casing 3 is firmly attached by welding or the like to the upper part of the sealed enclosure 1 on its other side (the outlet terminal side). The branch casing 3 and the common casing 4 are both arranged vertically to the longitudinal direction (the axis) of the sealed enclosure 1.

The branch casing 3 is attached to a position substantially opposing the upper terminals of the breakers 2 within the sealed enclosure 1 and line-side connecting conductors 7 are each extended into the branch, casing 3 for engagement with a plurality of current transformers 5 arranged to detect a fault on the line side. The free end-side of the branch casing 3 is hermetically closed with a conventionally-used insulating spacer 9 and connected to this portion is a line-side casing 10 in which are arranged cable heads 12, connected to the line-side connecting conductors 7 to serve as outlet terminals, ground switches 9a and 9c, and disconnecting switches for the line-side connecting conductor side and the cable head side. The outlet terminals disposed in the line-side casing 10 are not limited to the cable heads 12 and a bushing 12A may be used as indicated by the dot-and-dash line.

On the side of two main buses (double bus) 10a and 10b which are arranged one upon another vertically to extend in a direction perpendicular to the vertical axis of the vertical-type sealed enclosure 1, the common casing 4 is formed into a shape which extends in the height direction (the longitudinal direction) of the sealed enclosure 1 and it is firmly attached to the latter by welding or the like. Then, disposed inside the common casing 4 are connecting conductors 8a which are connected to the lower terminal of the breakers 2 and a plurality of current transformers 6 which are respectively fitted on the connecting conductors 8a. Also arranged inside the common casing 4 are common connecting conductors 8b which are each connected at its one end to the connecting conductor 8a and extended in the longitudinal direction substantially parallelly to the sealed enclosure 1. Each of the openings formed on the free end-side of the common casing 4 is sealed by a conventionally-used insulating spacer 8, and ground housings on the side of the main buses 10a and 10b are connected to these openings through the insulating spacers 8. Each of the common connecting conductors 8b extending longitudinally inside the common casing 4 is detachably connected to the associated current carrying conductors of the main buses 10a and 10b through disconnecting switches. Also, a common ground switch 9b for the main buses 10a and 10b is mounted on the upper part of the common casing 4 for opposite connection with the common connecting conductors 8b.

As shown by way of example in FIG. 2, the common casing 4 of this invention is one extended in the longitudinal direction of the sealed enclosure 1 and having for example an oval shape in section. It is used on its free end-side with connecting flanges 13 which are connected to the insulating spacers 8 and the main-bus ground switches. Since the common casing 4 is provided for such purposes that the breakers 2 of the respective phases are arranged inside the sealed enclosure 1 without being affected by the other component parts, no problem will be caused even if it is formed to have a rectangular shape in section to allow the juxtaposition of the common connecting conductors 8b of the three phases.

Since the common casing 4 is provided on the main bus side of the sealed enclosure 1 in this way, the sealed enclosure 1 can be formed into a barrel shape (usually cylindrical shape) having a sectional dimension which takes into consideration only the insulation of the breakers 2 of the three phases. The dimensions of the sealed enclosure 1 can be decreased such that its sectional area, for example, is considerably reduced to less than 75% of the conventional one and thus the dimensions (particularly the installation area) of the GIS can be reduced. Also, since the current transformers 5 and 6 are not arranged inside the sealed enclosure 1, the danger of causing any insulation problem due to the high-temperature insulating gas during the breaking is eliminated. In addition, due to the use of the common connecting conductors 8b arranged within the common casing 4 to extend in the longitudinal direction thereof, the connections with the main buses 10a and 10b, etc., are simplified and, even if a fault is caused in one of the main buses, the apparatus can be used without causing any effect on the other main bus. Moreover, since the ground switches 9a to 9c are respectively disposed on the line-side casing 10 connected to the branch casing 3 and the common casing 4, the maintenance and inspection as well as the assembling and disassembling operations, etc., can be performed easily.

Figure 3:
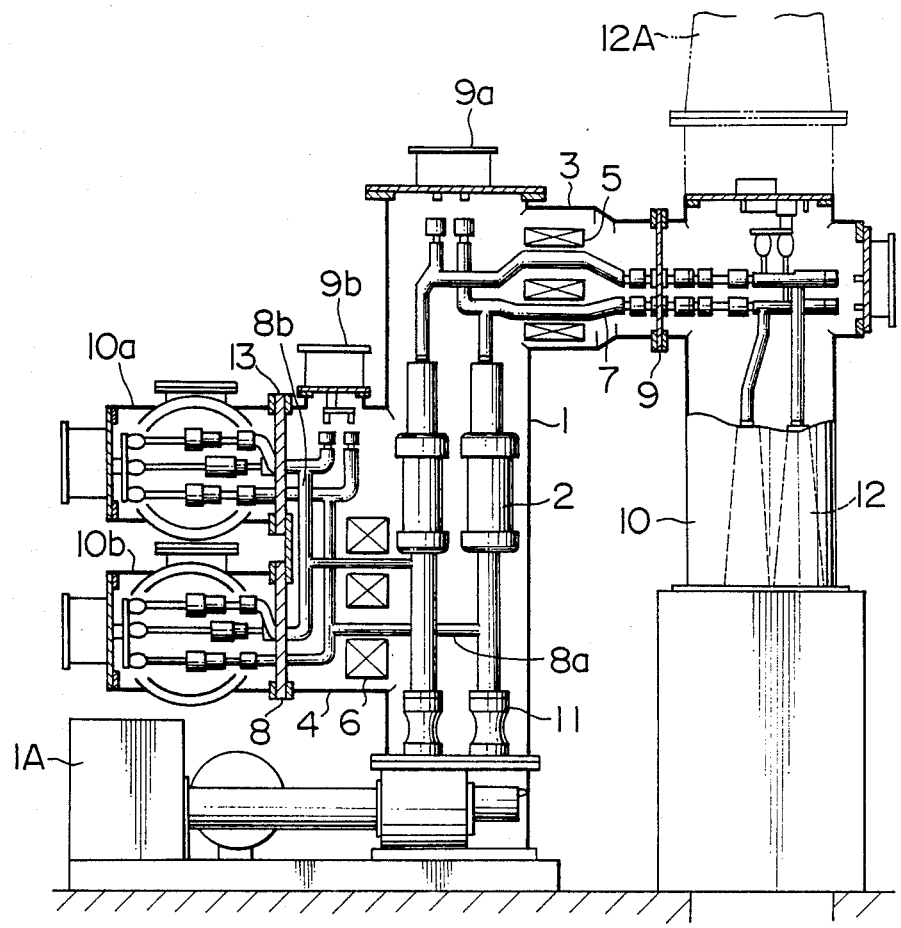
FIGS. 3 to 8 are schematic sectional views showing gas-insulated switchgear apparatus according to another embodiment of the invention.

The embodiment of the invention shown in FIG. 3 differs from the embodiment of FIG. 1 in that the mounting position of the ground switch 9a for maintenance and inspection purposes is changed. More specifically, the embodiment is the same in construction in that the line-side branch casing 3 and the double bus-side common casing 4, respectively disposed on the sides of the sealed enclosure 1, are arranged so that their axes are perpendicular to the axis of the sealed enclosure 1 as in the case of FIG. 1, that the current transformers 5 and 6, the connecting conductors 7 and 8a and the common connecting conductors 8b are respectively arranged inside the casings 3 and 4, and that the ground switch 9b for maintenance and inspection purposes is mounted on the common casing 4 on the double bus side, and the line-side ground switch 9a for maintenance and inspection purposes is disposed at the upper end of the sealed enclosure 1. By so constructing, the dimensions of the line-side casing 10 can be raised without changing the height of the sealed enclosure 1 itself and the positions of the cable heads 12 can be raised. Thus, there is the effect of simplifying the handling of the cable heads 12.

Figure 4:
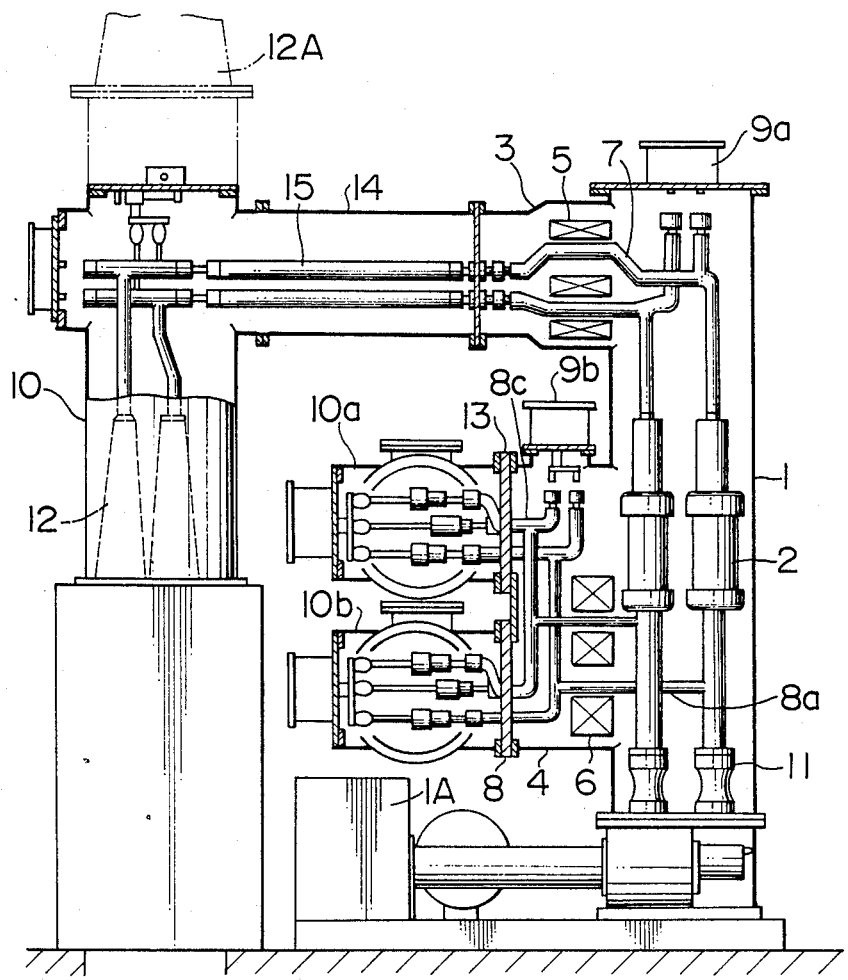

Referring now to FIG. 4 showing another embodiment of the GIS according to the invention, this embodiment is substantially the same in construction excepting partial modifications on the outlet terminal side. In this embodiment, the line-side branch casing 3 disposed on the side of the sealed enclosure 1 is attached to the same main bus side as the common casing 4, and an intermediate casing 14 for arranging extension conductors 15 in the branch casing 3 is employed so as to arrange the line-side casing 10 at the location most remote from the sealed enclosure 1.

By thus providing the casing for the line-side outlet terminals on the same side as the main buses 10a and 10b, even in a case where the outlet terminals must be positioned on the same side as the main buses, the invention can be applied without losing the previously mentioned features.

Figure 5:
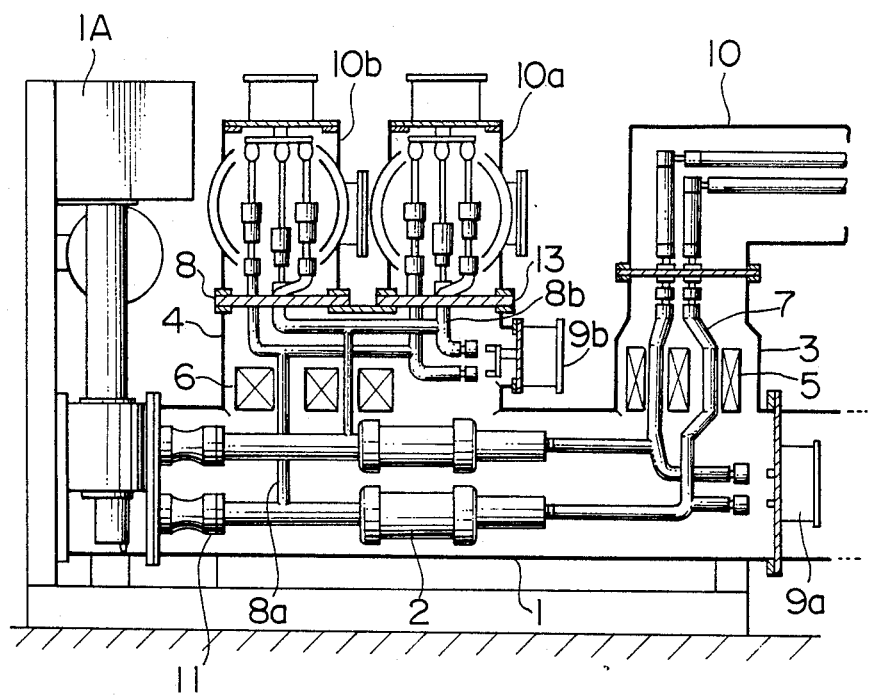

The embodiment of the invention shown in FIG. 5 shows an example of means required when the height dimension of the sealed enclosure 1 is increased. Thus, this embodiment is substantially the same in construction as the embodiment of FIG. 4 and the only difference is that the apparatus is designed as a horizontal type to position the double main buses 10a and 10b above the sealed enclosure 1. Thus, the line-side casing 10 may be bent at right angles from above as shown by the solid lines or alternatively it may be partially modified so as to be arranged on the extension line of the sealed enclosure 1 as shown by the dotted lines.

By designing the barrel-type sealed enclosure 1 as a horizontal construction, there is the effect that not only the overall height dimension is reduced with a resulting improved resistance against earthquake and both of the main buses 10a and 10b connected to the common casing 4 extending longitudinally on the upper surface of the sealed enclosure 1 are installed on the same level, but also the main buses 10a and 10b are supported on the sealed structure 1 through the common casing 4.

In the above-described embodiments of the GIS shown in FIGS. 1 to 5, the double main bus-side common casing 4 is formed with the plurality of connecting flanges 13 thus permitting direct connection of the main buses 10a and 10b independently of each other and the current transformers 6 and the bus-side common ground switch 9b for maintenance and inspection purposes are arranged at positions quite apart from each other within the common casing 4 on the main bus side, thereby making the disposition and arrangement of the internal connecting conductors 8a and common connecting conductors 8b simple, simplifying the assembling operation and improving the reliability from the insulating performance point of view.

Figure 6:
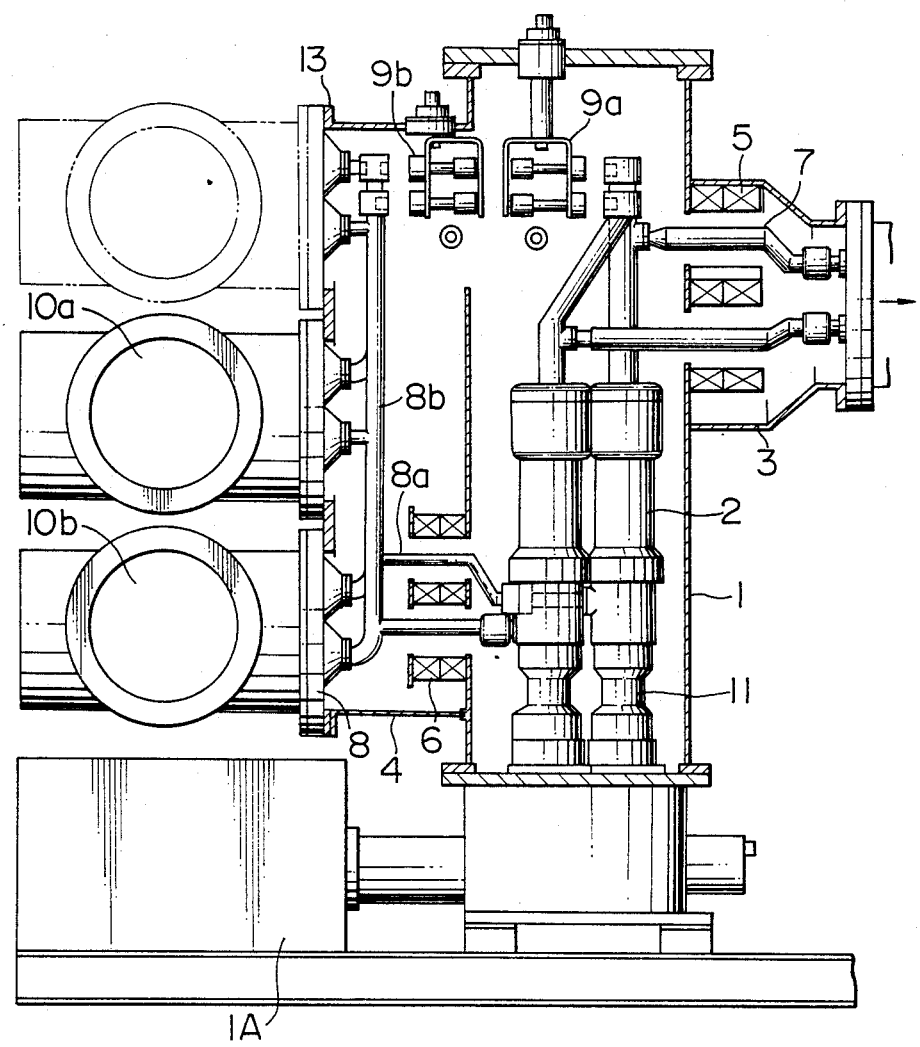

Referring to FIG. 6 showing another embodiment of the invention, this embodiment differs from the previously described embodiments only with respect to the size of the common casing 4. In other words, in this embodiment the common casing 4 attached to one side of the sealed enclosure 1 is formed so as to extend its size in the longitudinal direction of the latter and thereby to permit the connection of a third main bus shown by the dot-and-dash line as an additional one to the extended portion. For this purpose, the common connecting conductors 8b are also lengthened along the longitudinal direction within the common casing 4. Also, the ground switch 9b is arranged so as to be positioned laterally to the common connecting conductors 8b and similarly the line-side ground switch 9a is arranged in the upper part of the sealed enclosure 1 so as to oppose laterally to the line-side connecting conductors 7, thereby making it possible to use their operating devices (not shown) in common. The line-side branch casing 3 and the common casing 4 are respectively attached at the places of the openings formed in the upper and lower parts of the sealed enclosure 1 for the conductors 7 and 8a, respectively, and the sides of the enclosure 1 which are formed with these openings are utilized so as to firmly mount the current transformers 5 and 6 in place and thereby to simplify their mounting operations.

The above-described construction of the GIS shown in FIG. 6 is very effective in that it can be used effectively for the purpose of increasing the number of main buses in correspondence to an increase in the demand for electric power after the installation of the GIS or attaching reserve main buses for maintenance and inspection purposes, etc.

Figure 7:
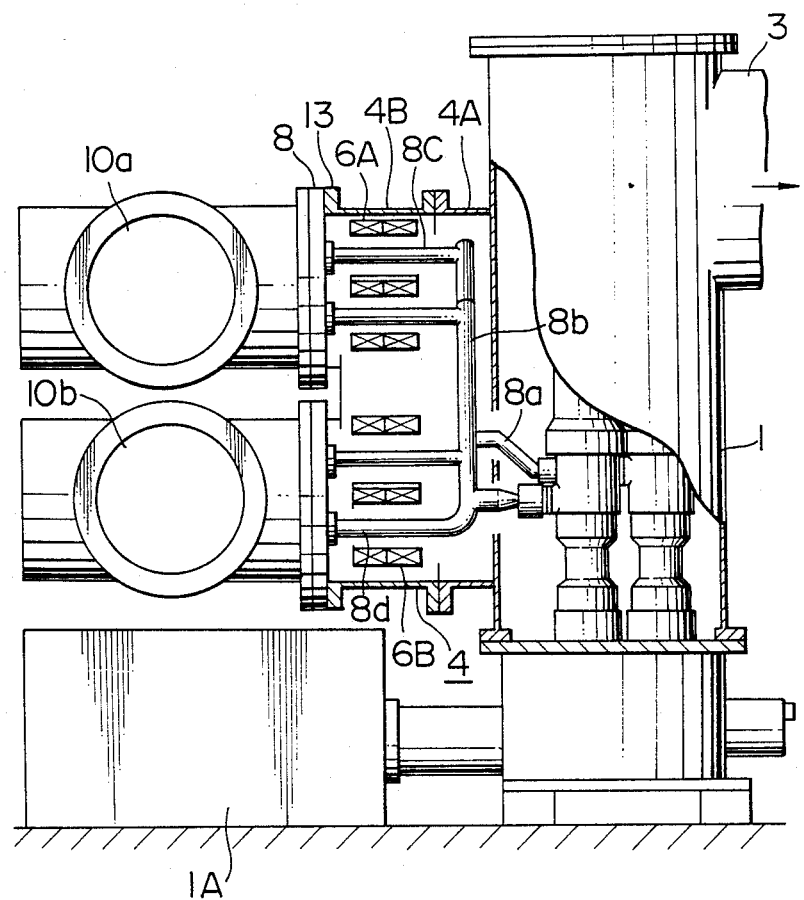

The embodiment of the GIS shown in FIG. 7 differs from the embodiment of FIG. 6 in that the common casing 4 attached to one side of the sealed enclosure 1 is divided into a first casing portion 4A attached to the sealed enclosure 1 and a second casing portion 4B connected to the first casing portion 4A and formed with the connecting flanges 13 which are connected to the main buses 10a and 10b. Arranged within the first casing portion 4A are the common connecting conductors 8b extended from the connecting conductors 8a in the longitudinal direction of the sealed enclosure 1 and arranged within the second casing portion 4B are current transformers 6A and 6B which are respectively fitted on bus-side conductors 8c and 8d which are connected to the common connecting conductors 8b.

By so forming the common casing 4, initially it is only necessary to attach the first casing portion 4A to the sealed enclosure 1 with the result that the manufacturing is simplified and the current transformers 6A and 6B can be arranged independently on the side of the main buses 10a and 10b, respectively, thereby ensuring positive faulty bus discrimination.

Figure 8:
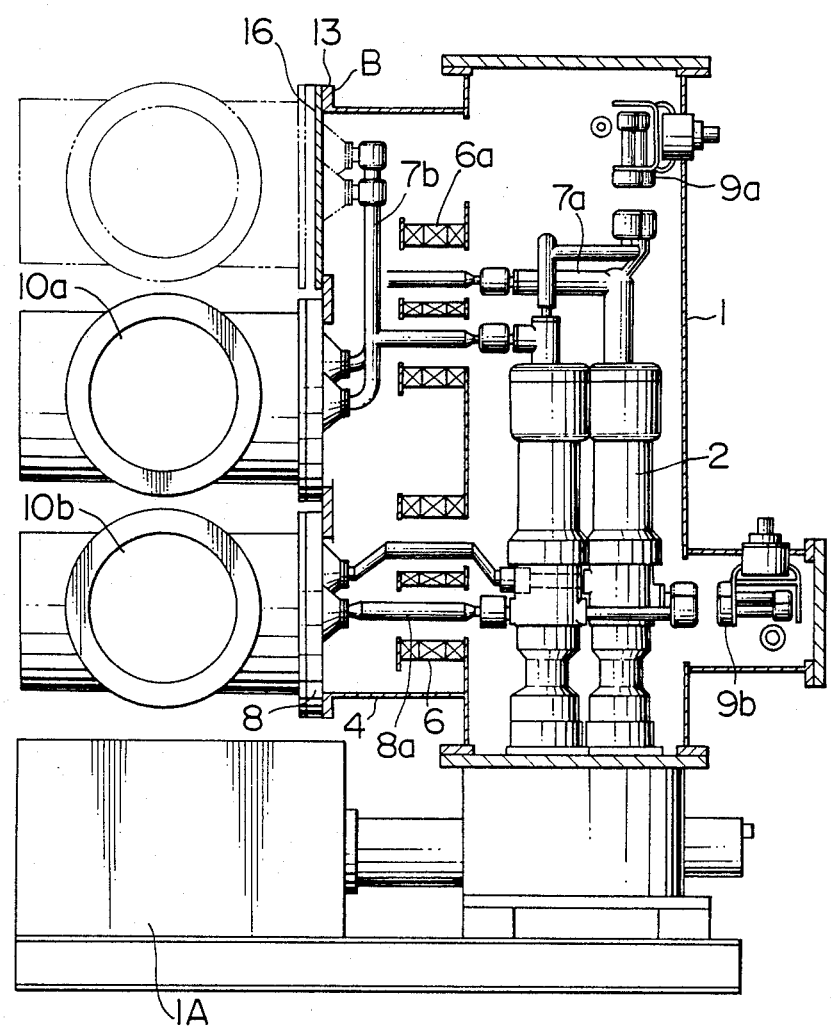

Referring to FIG. 8 showing still another embodiment of the invention, this embodiment shows a case in which the invention is applied to a bus connecting GIS. Thus, a common casing 4 is attached only to one side of a vertical-type cylindrical sealed enclosure 1 and three connecting flanges 13, including one in reserve, are formed at the free-end side surface of the common casing 4. Connecting conductors 7a and 8a respectively connected to the upper and lower terminals of breakers 2 are extended and contained in the common casing 4, and current transformers 6a and 6 are respectively fittingly mounted on the conductors 7a and 8a. The ground housing of each main buses 10a and 10b is coupled to and connected electrically to one of the connecting flanges 13 through an insulating spacer 8. A sealing plate 16 is made fast to the reserve main bus connecting flange B portion indicated by the dot-and-dash line. In the embodiment of FIG. 8, the common connecting conductors 7b formed in the like manner as the previously mentioned common connecting conductors are arranged for connection with the reserve main bus. Since this embodiment is a bus connecting GIS, ground switches 9a and 9b for the main buses 10a and 10b are disposed on the sealed enclosure 1 side.

It will thus be seen that the similar effects as the previously mentioned embodiments can also be attained by the application of the invention to a bus connecting GIS.

Thus, with a GIS according to the invention, due to the fact that a common casing is attached to one side of a sealed enclosure to extend in the longitudinal direction thereof and connecting conductors from the terminals of breakers and common connecting conductors are arranged inside the common casing for connection with main buses, it will suffice to form the sealed enclosure into a barrel or cylindrical shape having a sectional area sufficient to permit juxtaposition of the breaker of three phases with the result that the dimensions of the sealed enclosure for containing the breakers can be reduced considerably and the installation area of the GIS on the whole can also be reduced remarkably.

Further, since such components as current transformers, various conductors and accessories can be arranged inside common, casing, these components are not subjected to the effects of high temperature during the breaking period and thus the insulation reliability of the GIS is improved.

Still further, the current transformers can be arranged either on the main bus side or on the outlet terminal side without any difficulty and this is very effective for the protection of the GIS.

We claim:

1. A gas-insulated switchgear apparatus comprising:
   a barrel-type sealed enclosure having an insulated gas sealed therein;
   breakers of three phases contained in said sealed enclosure;
   a plurality of main buses each connected to at least one terminal of each of said breakers; and
   a common casing on which said plurality of main buses are arranged and which is integrally formed on one side of said sealed enclosure and which extends in a longitudinal direction of said sealed enclosure;
   said common casing being coupled to said main buses through a plurality of respective insulating spacers;
   said common casing containing a plurality of connecting conductors a respective one of which connect a terminal of said breakers to said main buses.

2. An apparatus according to claim 1, wherein a plurality of current transformers are respectively fitted on said plurality of connecting conductors and are arranged inside said common casing.

3. An apparatus according to claim 1, wherein said current transformers fitted on said connecting conductors are fixedly mounted at the side of said sealed enclosure.

4. A gas-insulated switchgear apparatus comprising:
   a barrel-type sealed enclosure having an insulating gas sealed therein and arranged in a vertical direction;
   breakers of three phases arranged within said sealed enclosure and parallel in a longitudinal direction thereof;
   a plurality of main buses each connected to at least one terminal of said breakers; and
   a common casing on which said buses one arranged and which is integrally formed on one side of said sealed enclosure and which extends parallel to a longitudinal direction thereof;
   said common casing being coupled to said main buses through a plurality of respective insulating spacers,
   said common casing containing a plurality of connecting conductors a respective one of which connect a terminal of said breakers to said main buses.

5. A gas-insulated switchgear apparatus comprising:
   a cylindrical sealed enclosure arranged in a vertical direction and having an insulating gas sealed therein;
   breakers of three phases arranged inside said sealed enclosure and parallel in a longitudinal direction thereof;
   a plurality of main buses each connected to at least one terminal of said breakers;
   a common casing on which said buses are arranged and which is integrally formed on one side of said sealed enclosure and which extends in the longitudinal direction thereof;
   said common casing being coupled to said main buses through a plurality of respective insulating spacers, said main buses being arranged in a longitudinal direction of said sealed enclosure;
   said common casing containing a plurality of connecting conductors a respective one of which connect a terminal of said breakers to said main buses.

6. A gas-insulated switchgear apparatus comprising:
   a barrel-type sealed enclosure arranged in a vertical direction and having an insulating gas sealed therein;
   breakers of three phases arranged within said sealed enclosure and parallel in a longitudinal direction thereof;
   a plurality of main buses each connected to at least one terminal of said breakers; and
   a common casing on which said buses are arranged and which is integrally formed on one side of said sealed enclosure and which extends in a longitudinal direction thereof;
   said common casing being coupled through a plurality of respective insulating spacers to said main buses which extend in a direction perpendicular to an axis of said sealed enclosure;
   said common casing containing a plurality of connecting conductors a respective one of which connect a terminal of said breakers to said main buses.

7. An apparatus according to claim 6, wherein said common casing includes a plurality of common connecting conductors each having one end thereof connected to one of said connecting conductors and extending in the longitudinal direction of said sealed enclosure, the other end of said common connecting conductor being connected to one of said main buses.

8. A gas-insulated switchgear apparatus comprising:
   a barrel-type sealed enclosure arranged in a longitudinal direction and having an insulating gas sealed therein;
   breakers of three phases arranged within said sealed enclosure and parallel in a longitudinal direction thereof;
   a plurality of main buses each connected to at least one terminal of said breakers; and
   a common casing on which said buses are arranged and which is integrally formed on one side of said sealed enclosure and which extends in the longitudinal direction thereof;
   said common casing being coupled through insulating spacers to said main buses which extend in a direction perpendicular to an axis of said sealed enclosure,
   wherein said common casing includes a plurality of connecting conductors each connected to a respective terminal of said breakers, a plurality of current transformers each fitted on a respective one of said connecting conductors, and a plurality of common connecting conductors each having one end thereof connected to one of said connecting conductors and extending in the longitudinal direction of said sealed enclosure, the other end of said common connecting conductors being connected to at least one of said main buses.

9. An apparatus according to claim 8, wherein said common casing is provided with a ground switch for selective connection to and disconnection from said common connecting conductors.

10. A gas-insulated switchgear apparatus comprising:
a cylindrical sealed enclosure arranged in a vertical direction relative to a surface on which said enclosure is installed and having an insulating gas sealed therein;
breakers of three phases arranged within said sealed enclosure and parallel in a longitudinal direction thereof;
a plurality of main buses each connected to one terminal of said breakers;
a plurality of outlet terminals each connected to the other terminal of said breakers;
a common casing on which said buses are arranged and which is integrally formed on one side of said sealed enclosure and which extends in a longitudinal direction thereof; and
a branch casing attached to an upper side of said sealed enclosure and accommodating said outlet terminals,
said common casing being coupled to main buses through a plurality of respective insulating spacers,
said common casing including a plurality of connecting conductors each connected to a respective terminal of said breakers, a plurality of current transformers each fitted on a respective one of said connecting conductors, and a plurality of common connecting conductors each having one end thereof connected to one of said connecting conductors and extending in the longitudinal direction of said sealed enclosure,
the other end of said common connecting conductors being connected to at least one of said main buses.

11. An apparatus according to claim 10, wherein said branch casing is attached to the opposite side of said enclosure relative to said common casing.

12. An apparatus according to claim 10, wherein said branch casing is attached to the same side of said enclosure as said common casing.

13. An apparatus according to claim 10, including a plurality of current transformers each fitted on a respective one of conductors of said outlet terminals and arranged within said branch casing.

14. An apparatus according to claim 10, wherein a cable head is used as said outlet terminal.

15. An apparatus according to claim 10, wherein a bushing is used as said outlet terminal.

16. An apparatus according to claim 10, wherein said branch casing has a longitudinal section of elliptic shape.

17. A gas-insulated switchgear apparatus comprising:
a cylindrical sealed enclosure arranged in a vertical direction relative to a surface on which said enclosure is installed and having an insulating gas sealed therein;
breakers of three phases arranged within said sealed enclosure and parallel in a longitudinal direction thereof;
a plurality of main buses each connected to one terminal of said breakers;
a plurality of outlet terminals each connected to the other terminal of said breakers;
a common casing on which said buses are arranged and which is integrally formed on one side of said sealed enclosure and which extends in a height direction thereof;
a branch casing attached to an upper side of said sealed enclosure, said branch casing communicating with a line-side casing which accommodates cable heads; and
said common casing being coupled to said main buses through a plurality of respective insulating spacers,
said common casing including a plurality of connecting conductors each connected to a respective terminal of said breakers, a plurality of current transformers each fitted on a respective one of said connecting conductors, and a plurality of common connecting conductors each having one end thereof connected to one of said connecting conductors and extending in the longitudinal direction of said sealed enclosure,
the other end said common connecting conductors being connected to at least one of said main buses,
a plurality of current transformers arranged within said branch casing so as to be respectively fitted on conductors of said outlet terminals.

18. An apparatus according to claim 17, wherein said branch casing is attached to the same side of said enclosure as said common casing.

19. An apparatus according to claim 17, wherein said branch casing includes a plurality of current transformers each fitted on a respective one of conductors of said outlet terminals.

20. An apparatus according to claim 17, wherein said branch casing has a longitudinal section of elliptic shape.

21. A gas-insulated switchgear apparatus comprising:
a cylindrical sealed enclosure arranged in a horizontal direction and having an insulating gas insulated and sealed therein;
breakers of three phases arranged within said sealed enclosure and parallel in a longitudinal direction thereof;
a plurality of main buses each connected to one terminal of said breakers;
a plurality of outlet terminals each connected to the other terminal of said breakers;
a common casing on which said buses are arranged and which is integrally formed on an upper surface of said sealed enclosure and which extends in a longitudinal direction thereof; and
a branch casing attached to said sealed enclosure and provided to accommodate said outlet terminals;
said common casing being coupled to said main buses through a plurality of respective insulating spacers;
said common casing including a plurality of connecting conductors each connected to a respective terminal of said breakers, a plurality of current transformers each fitted on a respective one of said connecting conductors, and a plurality of common connecting conductors each having one end thereof connected to one of said connecting conductors and extending in the longitudinal direction of said sealed enclosure;
the other end of said common conductors being connected to at least one of said main buses.

22. An apparatus according to claim 21, wherein said branch casing is attached to the upper surface of said sealed enclosure.

23. An apparatus according to claim 21, wherein said branch casing is attached to said sealed enclosure in the longitudinal direction thereof.

24. An apparatus according to claim 21, including a plurality of current transformers each fitted on a respective one of conductors of said outlet terminals and arranged within said branch casing.

25. A gas-insulated switchgear apparatus comprising:
a cylindrical sealed enclosure arranged in a vertical direction relative to a surface on which said enclosure is installed and having an insulating gas sealed therein;
breakers of three phases arranged within said sealed enclosure and parallel in a longitudinal direction thereof;
a plurality of main buses each connected to one terminal and the other terminal of said breakers; and
a common casing on which said main buses are arranged and which is integrally formed on one side of said sealed enclosure and which extends in the longitudinal direction thereof,
said common casing being coupled to said main buses through a plurality of respective insulating spacers,
said common casing including a plurality of connecting conductors each connected to a respective terminal of said breakers, a plurality of current transformers each fitted on a respective one of said connecting conductors, and a plurality of common connecting conductors each having one end thereof connected to one of said connecting conductors and extending in the longitudinal direction of said sealed enclosure,
the other end of said common connecting conductors being connected to at least one of said main buses.

26. An apparatus according to claim 25, wherein said common casing includes a ground switch provided for selective connection to and disconnection from said common connecting conductors.

27. An apparatus according to claim 25, wherein said common casing includes at least one connecting portion for a reserve main bus.

* * * * *